United States Patent [19]

Anderson

[11] Patent Number: 4,484,317

[45] Date of Patent: Nov. 20, 1984

[54] MULTIBEAM LENS/FILTER COMBINATION FOR SONAR SENSOR

[75] Inventor: Warren A. Anderson, Tiverton, R.I.

[73] Assignee: The United States of America as represented by the Secretary of the Navy, Washington, D.C.

[21] Appl. No.: 138,014

[22] Filed: Apr. 7, 1980

[51] Int. Cl.³ .............................................. H04B 13/00

[52] U.S. Cl. ...................................... 367/150; 367/905

[58] Field of Search ........................ 367/138, 150, 905; 73/642; 333/72; 310/335; 343/753

[56] References Cited

U.S. PATENT DOCUMENTS

| | | | |
|---|---|---|---|
| 2,423,459 | 7/1947 | Mason | 367/150 |
| 3,245,251 | 4/1966 | Ardenne | 73/642 |
| 3,269,173 | 8/1966 | Ardenne | 73/642 |
| 3,433,461 | 3/1969 | Scarpa | 310/334 |
| 3,754,208 | 8/1973 | Eilers | 367/150 |
| 3,825,887 | 7/1974 | Murry | 367/138 |
| 4,001,766 | 1/1977 | Hurwitz | 367/150 |
| 4,021,812 | 5/1977 | Schell et al. | 347/753 |
| 4,168,482 | 9/1979 | Sternberg | 367/150 |
| 4,169,268 | 9/1979 | Schell et al. | 343/909 |
| 4,194,209 | 3/1980 | Colbourn | 343/753 |

OTHER PUBLICATIONS

Sternberg et al., "Log Periodic Acoustic Lens-Acoustic . . . ", 5/78, pp. 1617–1621, J. Acoust. Soc. Am., 63 (5).

Hixson et al., "Broadband Constant Beamwidth Acoustical . . . ", 5/1/70, pp. 1–37, Univ. of Texas, Tech. Memo #19.

Koch et al., "Refracting Sound Waves", 9/49, pp. 471–481, Jour. Acous. Soc. of Am., vol. 21, #5.

Sternberg, "Tapered Plates . . . Antenna Problem", 3/14/78, pp. 1–36, Structures/Mechanics Seminar, Princeton Univ.

*Primary Examiner*—Nelson Moskowitz

*Attorney, Agent, or Firm*—Robert F. Beers; Arthur A. McGill; Prithvi C. Lall

[57] ABSTRACT

A frequency independent acoustic antenna has an acoustic filter plate located between a lens and sensor/-transmitter. When used as a receiver this arrangement of components enables the lens to receive plane waves emanating from a source. This results in materially enhanced beam forming characteristics and performance. The arrangement is also suitable for use in the transmitting mode.

8 Claims, 8 Drawing Figures

MULTIBEAM LENS/FILTER COMBINATION FOR SONAR SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to acoustics and more particularly to underwater sound transmitting or receiving systems with the unique property of having a directional constant beamwidth diffraction pattern over a wide band of frequencies either with or without scanning.

A prior invention, Robert L. Sternberg, U.S. patent application Ser. No. 784,186 recites a frequency indepedent FLYEYE type lens/filter arrangement. The device places its lens between its filter plate and sensor/transmitter. When used as a receiver the plane waves from a source on passing through the filter plate assume a conical shape that present problems to the focusing lens and result in distortion.

SUMMARY OF THE INVENTION

It is therefore a general object of the present invention to provide an improved acoustic antenna mechanism. It is a further object that the acoustic antenna mechanism provide a constant beamwidth diffraction pattern over a wide range of frequencies suitable for fixed or scannable directional sound reception or transmission. Another object is that the receiving or transmitting mechanism be suitable for use with underwater sound. Other objects are that the mechanism be suitable for use in oil exploration, ultrasonic medical diagnostics and various other acoustic enterprises. Further object are that the device be compact, economical, rugged and durable. These and other objects of the invention and the various features and details of construction and operation will become apparent from the specification and drawings.

These several objectives are accomplished in accordance with the present invention by providing an acoustic filter plate functioning as a lens stop for transmitting low frequencies over an effective aperture of a large area and high frequencies over an effective aperture of a small area. For frequencies between the low and high frequency the filter plate will transmit an increasing frequency through an effective aperture of decreasing area. A wide band inphase piezoelectric array or any other substantially plane wave wide band transducer placed in back of the filter plate acts in conjunction with the filter plate to produce a directional transmitting or receiving device whose diffraction pattern has a constant beamwidth independent of frequency. In the configuration the filter plate is placed between the lens and transducer. The filter plate acts in conjunction with the transducer to provide a directional scannable transmitting or receiving device whose diffraction pattern has a beamwidth which is substantially constant independent of frequency over the spectrum from the high to the low frequency involved and is also scannable at wide angles of the axis of the device. The arrangement of components assures that when used as a receiving device the lens sees plane waves emanating from the source as contrasted with conically distorted waves in the prior art.

DESCRIPTION OF THE PREFERRED EMBODIMENT

Figure 1:
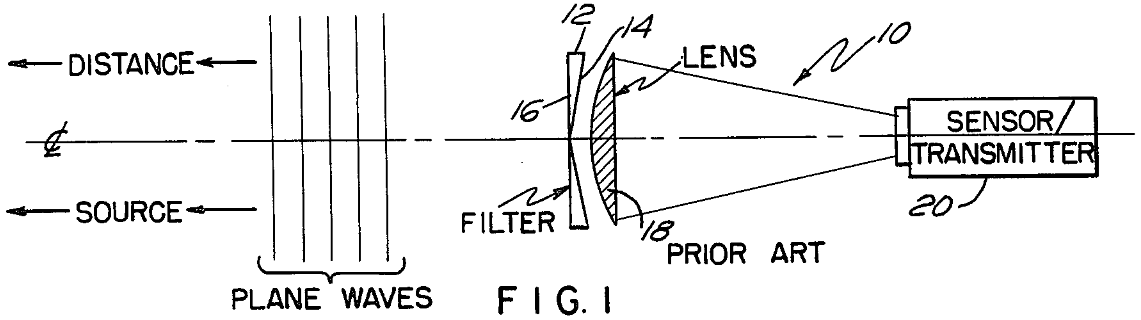
FIG. 1 is a view of a prior art frequency independent acoustic antenna.

Referring now to FIG. 1 there is shown a frequency independent acoustic antenna 10 similar to that described by R. Sternberg in U.S. patent application Ser. No. 784,186. The device includes an acoustic filter plate 12 that is normally a figure of revolution with a right circular conical surface 14 and a circular flat surface 16. The material of the filter plate 12 used was stainless steel although other materials can be used.

The maximum frequency transmitted by plate 12 at any place is a function of the thickness of plate 12. In particular, at the center of the plate 12 higher frequencies are transmitted than near the rim. Each portion of the plate has a cutoff frequency with all frequencies lower than the cutoff frequency being transmitted. Using a stainless steel plate of varying thickness with the thickness increasing from the center outward, wavelengths of sound in the metal of the plate shorter than twenty times the thickness of any portion of plate 12 will be inhibited from that portion outward from transmitting through the plate. In other words, the thickness of the plate at each point is approximately 1/20 wavelength of the cutoff frequency of the sound in the metal of the plate at that point. All lower frequencies are conducted and all higher frequencies have their transmission inhibited. It is seen that in the present invention low frequencies are transmitted over a large diameter central area of plate 12 and the higher the frequency the smaller the diameter of the conductive central area. Since beamwidth is a constant multiple of the ratio $\lambda/d$, where d is the diameter of the central area of the plate 12 which transmits the sound of wavelength $\lambda$, it can be seen that the square root of the surface area of plate 12 transmitting sound is in direct proportion to the wavelength of the applied signal.

Referring to the remainder of FIG. 1 there is shown an acoustic lens 18 for focusing acoustical waves 22, and a sensor/transmitter 20.

In operation as an acoustic receiving or listening device an acoustic signal exterior to acoustic antenna 10 impinges on filter plate 12. A portion of the filter plate 12 determined by the frequency of the signal, and the geometry and material properties of the plate 12, transmits the acoustic signal to lens 18. Lens 18 then focuses the acoustic signal on sensor/transmitter 20. In practice difficulty in obtaining a precise focus was encountered that is probably due to the fact that acoustic waves travel faster in the plate 12 material than in air. Due to the varying thickness of the plate 12, the plane wave striking the filter plate surface 16 reappear from surface 14 in conical shape with the portion of the wave at the center of the plate 12 trailing the remainder of the wave.

Figures 2A, 2B, 2C:
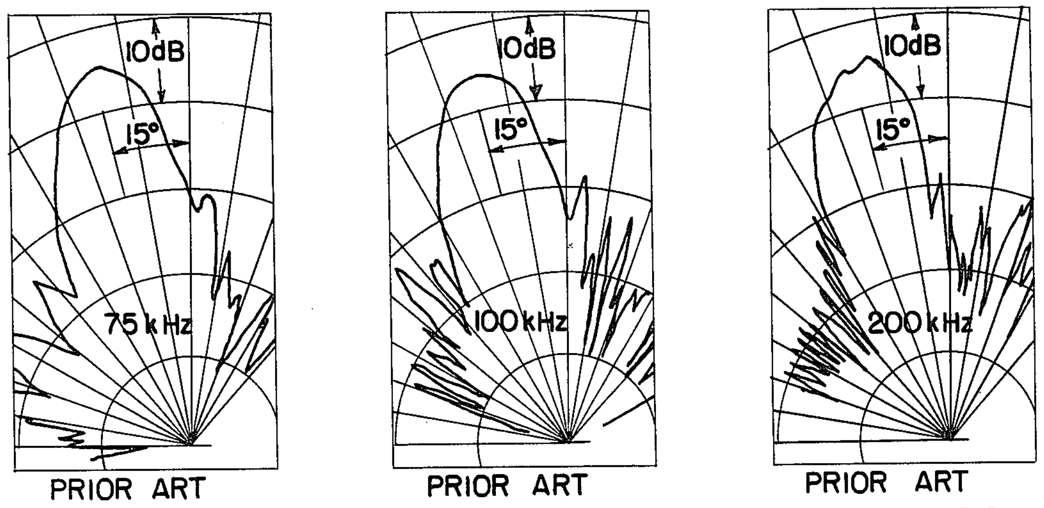
FIGS. 2A–2C show the 15° off-axis beam pattern of the prior art acoustic antenna of FIG. 1 when used as a receiver at various frequencies.

FIGS. 2A–2C show the result for the prior art device of FIG. 1.

Figure 3:
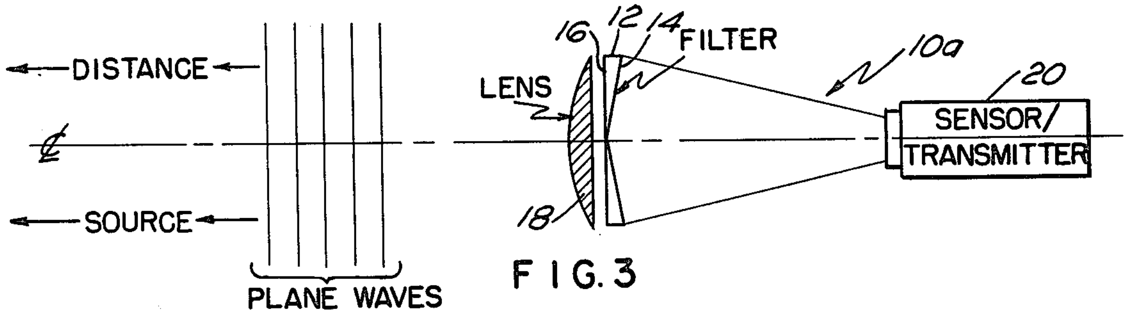
FIG. 3 is a view of a frequency independent acoustic antenna with the components arranged in accordance with the present invention.

Referring now to FIG. 3 there is shown the new assembly that comprises acoustic antenna 10*a*. The filter 12, lens 18 and sensor/transmitter 20 are identical to those of FIG. 1 with the filter 12 and lens 18 having their respective position interchanged.

Figures 4A, 4B, 4C:
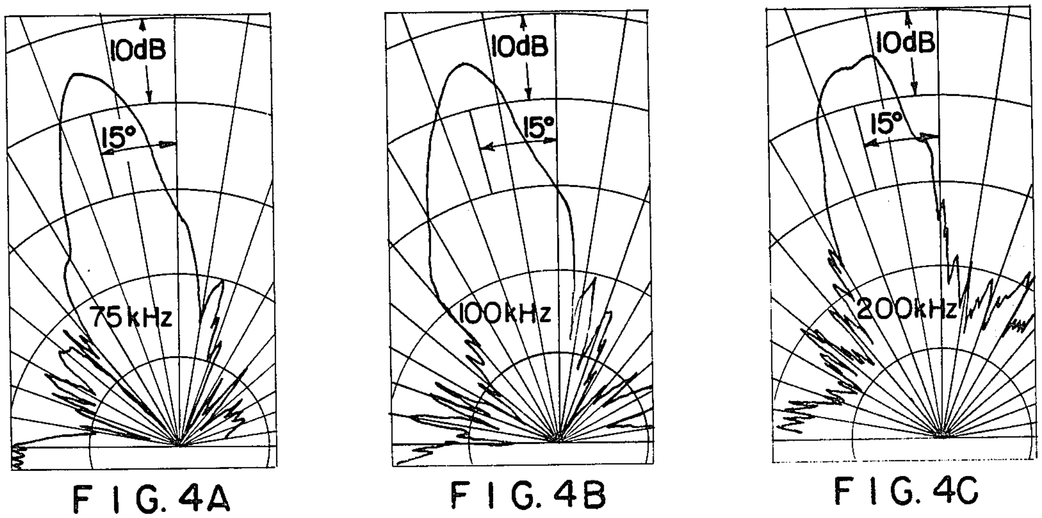
FIGS. 4A–4C show the 15° off-axis beam pattern of the present invention acoustic antenna of FIG. 3 when used as a receiver at various frequencies.

In this antenna 10*a* when used as a receiver, the plane waves 22 strike the lens 18 prior to the filter 12. This results in the improved frequency independent results achieved with the present invention are shown in FIGS. 4A–C. Note the reduction in scalloping of the side lobes and the improved contour of the major lobe.

There has therefore been described a uniform beamwidth frequency independent acoustic antenna 10*a*. The antenna has wide band frequency independent acoustic radiation and receiving properties for unidirectional or multidirectional scannable operation. The filter plate 12 could be made of other metals or of materials of composite structure incorporating provisions for localized phase or aberration correctors. The correctors could be made of polystyrene, plexiglass or other material in any way obvious to those skilled in the art of acoustic devices. When used as a receiver the arrangement of components reduces the scalloping in the received signals. In addition the received signals have a smoother contour and a closer resemblance to each other at various frequencies. The arrangement of components is also suitable for use in the transmitting mode.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An acoustic antenna comprising:
transducer means for converting applied signals;
an acoustic lens in acoustic communication with said transducing means; and
a filter plate located between said acoustic lens and said transducer means, said filter plate comprises a lens stop having an automatically variable aperture of a diameter that is a linear function of the reciprocal of the frequency.

2. An acoustic antenna comprising:
transducer means for converting applied signals;
an acoustic lens in acoustic communication with said transducing means; and
a filter plate located between said acoustic lens and said transducer means, said filter plate being of variable thickness has first and second opposing surfaces, said first surface is substantially planar and said second surface is substantially right circular conical with the axis of said conical surface perpendicular to said first surface, the thickness of the plate between said first and second surface at any point having means for varying with the radial distance from the axis to that point in such a way as to keep the beamwidth of a transmitted beam constant independent of the frequency.

3. An acoustic receiver comprising:
a sensor;
an acoustic lens in acoustic communication with said sensor; and a filter plate located between said acoustic lens and said sensor, said filter plate comprises a lens stop having an automatic variable aperture of a diameter that is a linear function of the reciprocal of the frequency.

4. An acoustic receiver comprising:
a sensor;
an acoustic lens in acoustic communication with said sensor; and
a filter plate located between said acoustic lens and said sensor, said filter plate is of variable thickness having first and second opposing surfaces, said first surface is substantially planar and said second surface is substantially right circular conical with the axis of said conical surface perpendicular to said first surface, the thickness of the plate between said first and second surface at any point having means for varying with the radial distance from the axis to that point in such a way as to keep the beamwidth of a transmitted beam constant independent of the frequency.

5. A scannable acoustic receiver comprising:
a scannable sensor;
an acoustic lens in acoustic communication with said scannable sensor; and
a filter plate located between said acoustic lens and said scannable sensor, said filter plate comprises a lens stop having an automatic variable aperture of a diameter that is a linear function of the reciprocal of the frequency.

6. A scannable acoustic receiver comprising:
a scannable sensor;
an acoustic lens in acoustic communication with said scannable sensor; and
a filter plate located between said acoustic lens and said scannable sensor, said filter plate is of variable thickness having first and second opposing surfaces, said first surface is substantially planar and said second surface is substantially right circular conical with the axis of said conical surface perpendicular to said first surface, the thickness of the plate between said first and second surface at any point having means for varying with the radial distance from the axis to that point in such a way as to keep the beamwidth of a transmitted beam constant independent of the frequency.

7. An acoustic antenna comprising:
transducer means for converting applied signals;
an acoustic lens in acoustic communication with said transducing means; and
a filter plate located between said acoustic lens and said transducer means and being in acoustic communication with both said acoustic lens and said transducer means, said filter plate having acoustic means for providing a diffraction pattern having a beamwidth that is substantially constant over a range of at least one octave of frequency.

8. An acoustic receiver comprising:
a sensor;
an acoustic lens in acoustic communication with said sensor; and
a filter plate located between said acoustic lens and said sensor and being in acoustic communication with both said acoustic lens and said sensor, said filter plate having acoustic means for providing a diffraction pattern having a beamwidth that is substantially constant over a range of at least one octave of frequency.

* * * * *